United States Patent [19]

Meyers et al.

[11] Patent Number: 5,450,939
[45] Date of Patent: Sep. 19, 1995

[54] APPARATUS AND METHOD FOR TRANSFERRING OBJECTS

[75] Inventors: William J. Meyers, Clarence Center; Richard O. Toles, Wilcott; Steven P. Nicoll, Webster; Edward F. Gates, Hilton, all of N.Y.

[73] Assignee: Eastman Kodak Company, Rochester, N.Y.

[21] Appl. No.: 159,971

[22] Filed: Nov. 30, 1993

[51] Int. Cl.$^6$ ............................................. B65G 47/46
[52] U.S. Cl. ..................... 198/349.95; 198/803.5; 198/370.12; 209/905
[58] Field of Search ............... 198/349.95, 365, 370, 198/471.1, 803.5; 209/511, 905; 294/64.1

[56] References Cited

U.S. PATENT DOCUMENTS

| | | | |
|---|---|---|---|
| 2,639,025 | 5/1953 | Schmitt | 198/184 |
| 2,921,667 | 1/1960 | Willsey | 198/179 |
| 2,969,869 | 1/1961 | Klingler | 198/803.5 |
| 3,170,581 | 2/1965 | Temple | 294/64.1 |
| 3,262,243 | 7/1966 | Molins | 53/150 |
| 3,587,816 | 6/1971 | Russell et al. | 198/471.1 |
| 3,757,926 | 8/1973 | Gendron et al. | 198/38 |
| 3,851,751 | 12/1974 | Jones | 198/179 |
| 4,222,479 | 9/1980 | Dugan et al. | 198/471.1 |
| 4,296,660 | 10/1981 | Cristiani | 83/100 |
| 4,391,372 | 7/1983 | Calhoun | 198/370 |
| 4,508,207 | 4/1985 | Oberdorf | 198/478 |
| 4,752,206 | 6/1989 | Nowicki et al. | 198/471.1 |
| 4,907,699 | 3/1990 | Butcher et al. | 198/349.95 |

Primary Examiner—Joseph E. Valenza
Attorney, Agent, or Firm—Charles E. Snee, III

[57] ABSTRACT

An apparatus (10) for sorting and transferring an object (1), such as wrapped photographic film, between two or more positions has a object holder (12) having a means for grasping and releaseably mounting the object (1) thereto. The object holder (12) is mounted for translational movement along a generally oval path (14). The object holder mounted to a first moving conveyance (16) moves in synchronization with a second moving conveyance (22), picks up the object (1) from the first moving conveyance (16), and then selectively sorts and releases the object (1) at one of several predetermined number of stations $S_1$, $S_2$, $S_3$.

15 Claims, 7 Drawing Sheets

FIG. 1

(PRIOR ART)

APPARATUS AND METHOD FOR TRANSFERRING OBJECTS

FIELD OF THE INVENTION

The invention relates to a method and apparatus for precisely picking up and delivering objects between two or more positions. More particularly, the invention concerns a method and apparatus for precisely picking up objects, for example, wrapped photographic film rolls, from a moving conveyance and transferring the wrapped objects to one of several predetermined stations, such as cartoning or reworking.

BACKGROUND OF THE INVENTION

Figure 1:
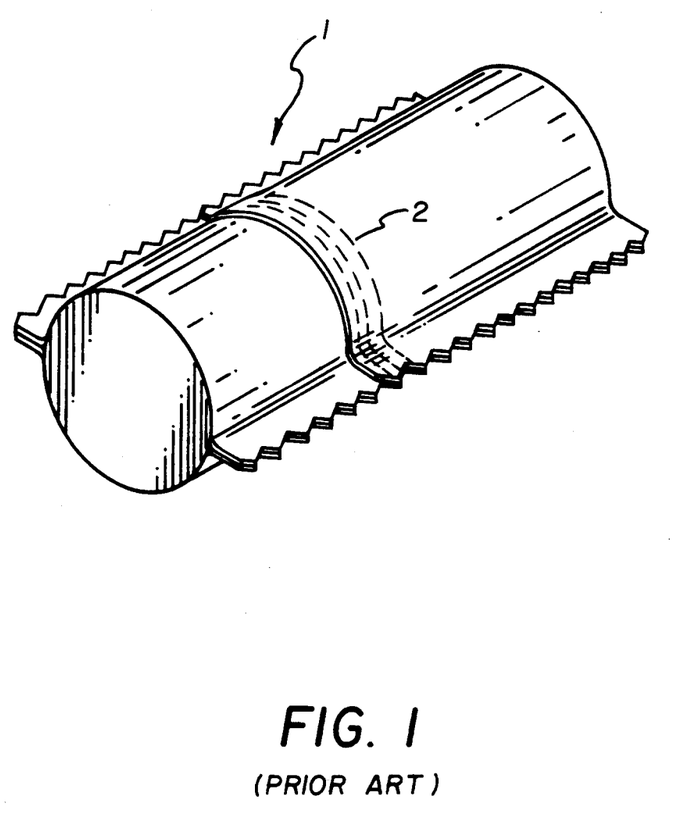
FIG. 1 is a perspective view of a typical object transported and sorted by the apparatus.

Conventional photographic web roll wrapping operations employ a centrifugal feeder that delivers spools of web, in single file, to a wrapper via a moving conveyance. Once at the wrapper station, the spools are individually wrapped with a suitable packaging material, such as the type described and illustrated in U.S. patent application Ser. No. 882,387, filed on May 13, 1992. Then the wrapper is sealed to produce a package having the generally cylindrical appearance shown in FIG. 1 of the present application. Protection of the roll of photosensitive film against light, dirt and moisture penetration is provided by the disclosed packaging. Prior to entering the wrapper station, the pitch and the position of each transported spool on the moving conveyance are predetermined so as to facilitate handling and transport of the wrapped rolls downstream of the wrapper. A typical wrapping operation for photosensitive web rolls may include first providing a continuous web of suitable overwrap material, nominally a light and moisture impervious material, and then forming with the overwrap material a tubular shaped wrap around each spool. As the spools progress through the wrapper, a longitudinal seal 2 (FIG. 1) is made in a top portion of the tubular wrap via a pair of heated finwheels. The resultant enclosed spools are then conveyed to a "tucking device" which provides the overwrap "tucks" on either side of the spool. Thereafter, the tubular wraps, each having a longitudinal seal, are then further formed by a pair of forming wheels and the spools begin to take their final configuration. After forming, the tubular wraps enclosing each of the spools are then conveyed to a "sealing station" which provides opposing cross sealed portions thereby forming a continuous stream of joined packaged film rolls. The stream of packaged film rolls is then conveyed through a rotary cutting station which cuts the packaged rolls into individual or single packaged film spools.

In certain instances, the wrapper operation or some other sub-system will malfunction causing packaged spools at certain locations along the conveyance to be exposed to deleterious conditions, such as excessive temperatures or pressures, resulting in rejectable product. The operator then must manually remove suspected affected products from the wrapper stream and sort them accordingly. For instance, if a wrapper malfunction arises, packaged spools in the conveyance stream may be exposed to exceedingly high temperatures that could compromise the integrity of the overwrapped photosensitive film product. Such affected photosensitive film spools are therefore transported to predetermined reject or rework stations positioned downstream of the cutting operation. According to one known practice, packaged spools exiting the cutting station are transported to one of several predetermined stations including an acceptable product station, a reject station or a rework station each positioned downstream of the cutting station.

There is no known practice for precisely picking up and sorting packaged photosensitive film spools by acceptability or rejectability, and selectively delivering the objects automatically to predetermined stations, such as those described above.

Accordingly, there persists a need for an apparatus and method for precisely picking up objects and sorting them by acceptability and rejectability, and then selectively releasing the objects to one of several predetermined stations prior to shipping that is simple to operate, easy to manufacture, capable of high speeds, and is reliable.

SUMMARY OF THE INVENTION

An object of the present invention is to provide an apparatus and method for precisely picking up and delivering an object to a predetermined station in which the object holder moves on a first moving conveyance in synchronism with a second moving conveyance.

Another object of the present invention is to provide such an apparatus and method which are capable of operating at very high rates of speed.

Yet another object of the present invention is to provide such an apparatus and method which can deliver objects to one or more of a predetermined number of stations in response to a predetermined decision concerning acceptability and rejectability.

To accomplish these and other objects of the invention, there is provided, in one aspect of the invention, an apparatus for conveying and sorting objects between predetermined stations along a fixed path comprising at least one object holder mounted for translational movement. The object holder is provided with means for grasping and releasably holding the object in a fixed orientation. Means are provided for moving the object holder along a continuous closed loop path having a first centerline. Preferably, the moving means comprises a first moving conveyance supported by guide members. Further, means are provided for selectively identifying the object for release at one of a predetermined number of stations along the path. In the preferred embodiment, the identifying means comprises a programmable logic controller that communicates with each of the stations along the first moving conveyance.

In another aspect of the invention, a method for precisely picking up and delivering an object between predetermined stations comprises the step of providing an object holder having means for releaseably holding the object. The object holder in this embodiment is mounted for movement along a first moving conveyance defining a closed loop, generally oval shaped path. Further, the object holder is activated for synchronization with a second moving conveyance positioned upstream of the first moving conveyance thereby causing a first object to be graspable from the second moving conveyance. Moreover, a vacuum source is provided integral to the first moving conveyance for grasping, holding and releasing the object at one of a predetermined number of stations along the path. The objects are then grasped from the upstream moving conveyance, sorted, and then released at one of a predetermined number of stations along the path.

Accordingly, important advantages of the present apparatus and method for precisely picking up, sorting and then delivering objects between predetermined stations are that the invention provides high reliability, easy operation, and relatively high speed capability.

BRIEF DESCRIPTION OF THE DRAWINGS

The foregoing as well as other objects, features and advantages of this invention will become more apparent from the appended Figures, wherein like reference numerals denote like elements, and wherein.

DETAILED DESCRIPTION OF THE INVENTION

Figure 2:
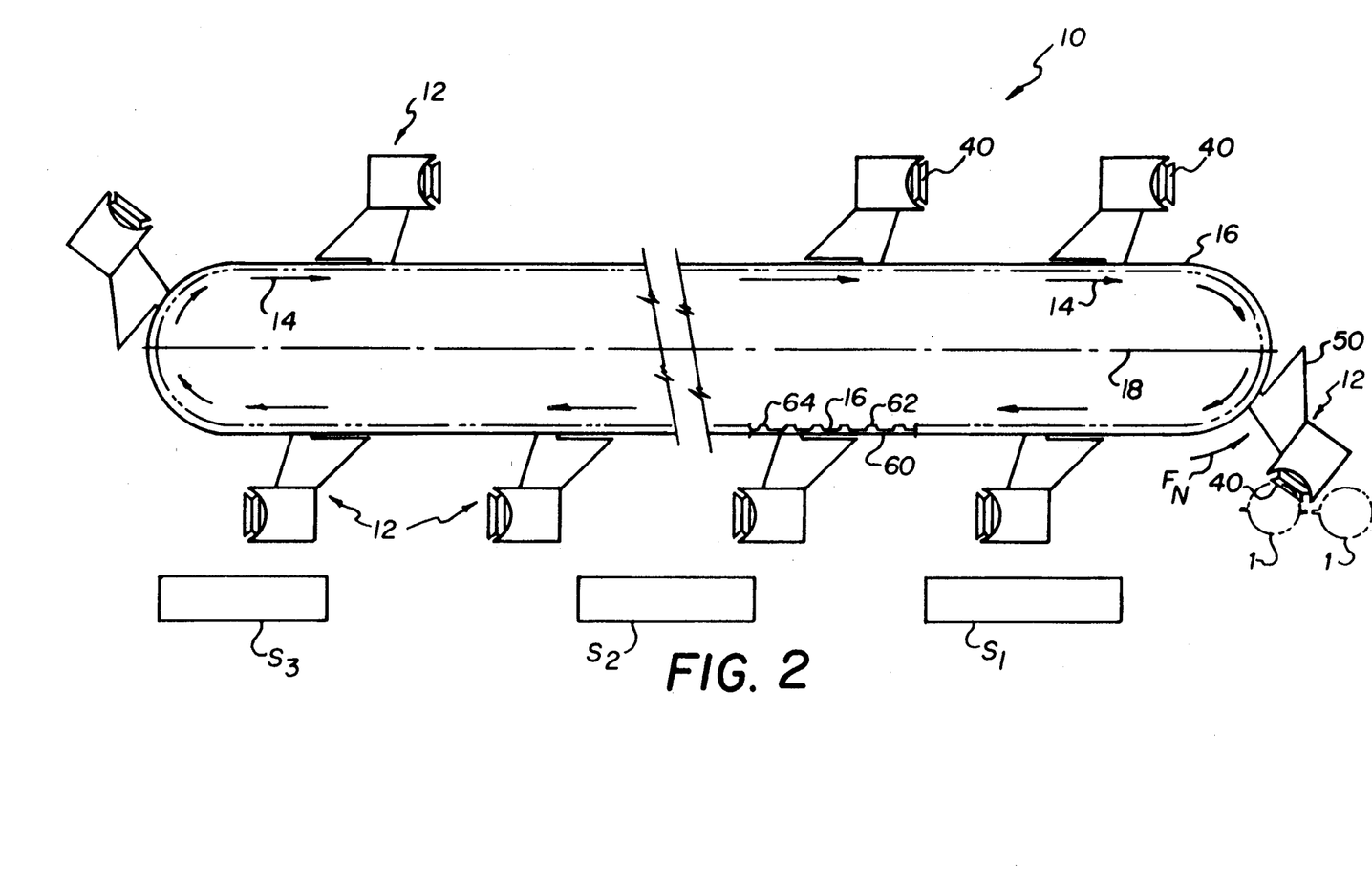
FIG. 2 is a fragmentary side view of the apparatus.
Figure 3:
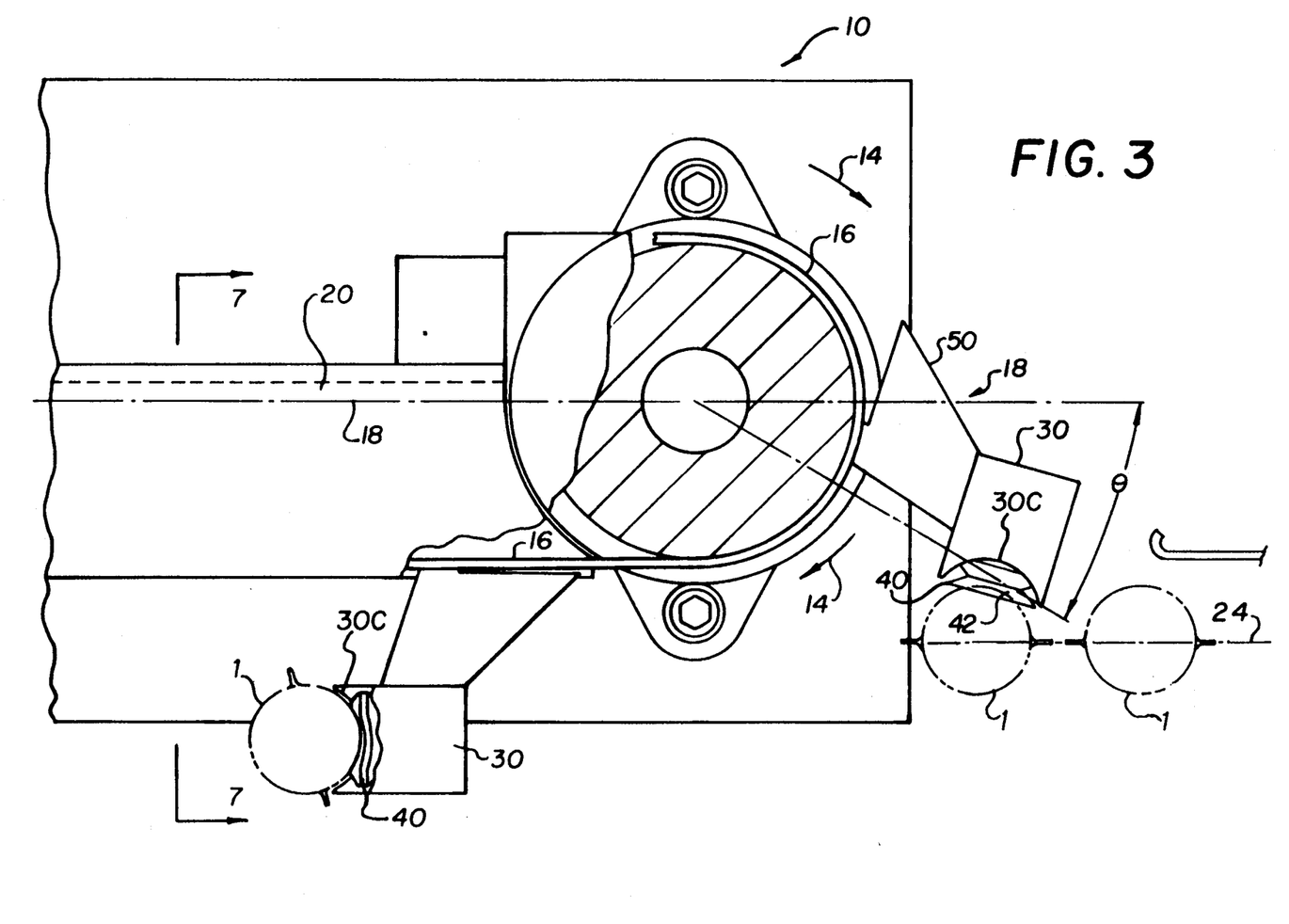
FIG. 3 is a side view, partially sectioned, of one end of a conveyance system according to the invention.
Figure 4:
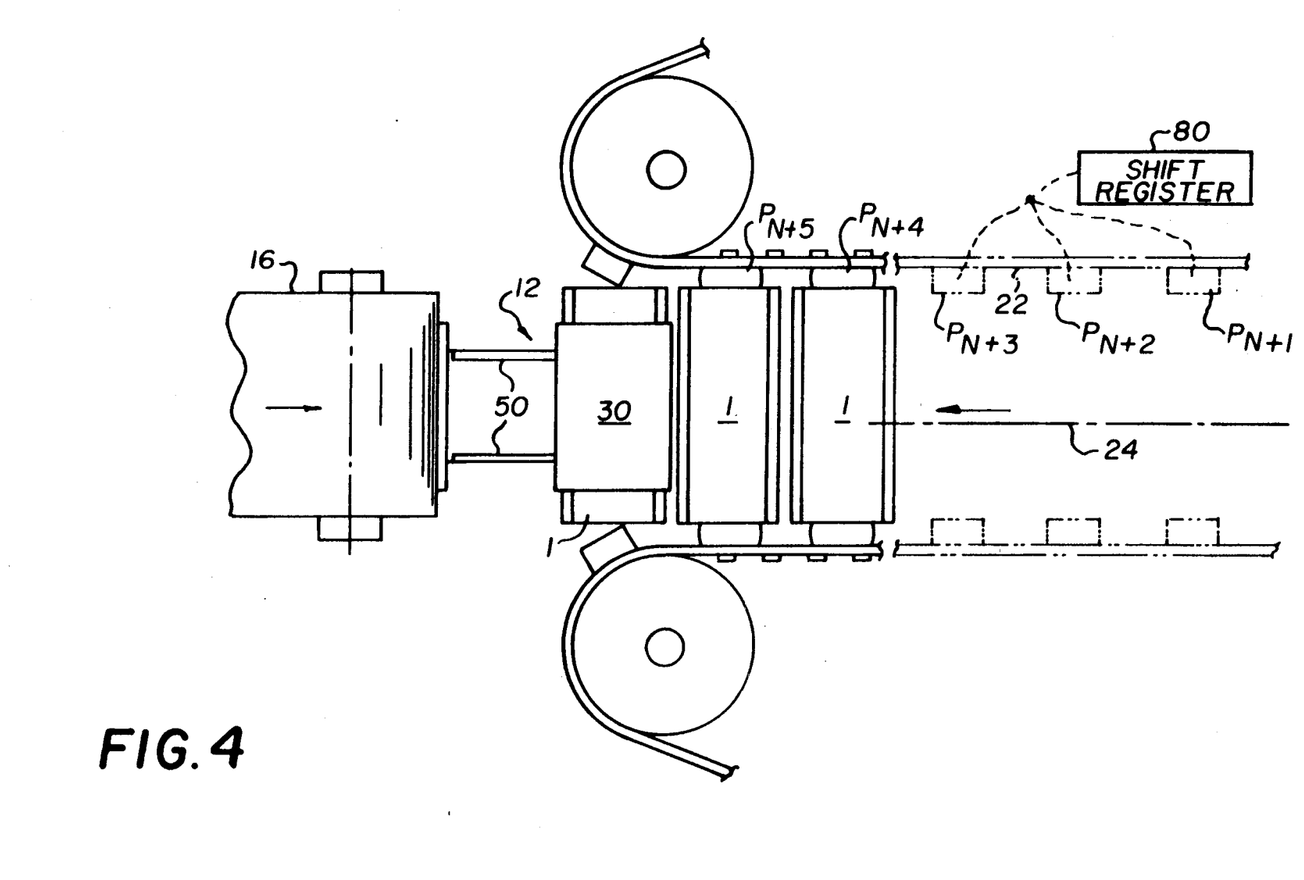
FIG. 4 is a top plan view of the apparatus.

Turning now to the drawings, and more particularly to FIGS. 2-4, an apparatus 10 of the invention is illustrated which is particularly suited for precisely picking up objects, such as packaged photographic film rolls, from an infeed conveyance and delivering the objects 1 to predetermined stations along an outfeed conveyance. Broadly defined, the apparatus 10 comprises at least one object holder 12 mounted for translational movement along a continuous closed loop path 14 having a first centerline 18. In the preferred embodiment, continuous path 14 is defined by a first moving conveyance 16 (or outfeed conveyance), such as a timing belt, described below. Apparatus 10 is further provided with means 20 for applying vacuum through belt 16 to holder 12 to grasp an object 1 from a second moving conveyance 22, such as a conveyor, and to releasably secure the object 1 to the object holder 12, described in greater details below. In this embodiment, first moving conveyance 16 is adapted for synchronization with the second moving conveyance 22. Moreover, as shown in FIGS. 3 and 4, the second moving conveyance 22, having a second centerline 24, is positioned in a plane beneath the first moving conveyance 16 for most effective transfer of objects 1 from the second moving conveyance 22 to the first moving conveyance 16.

Figure 5:
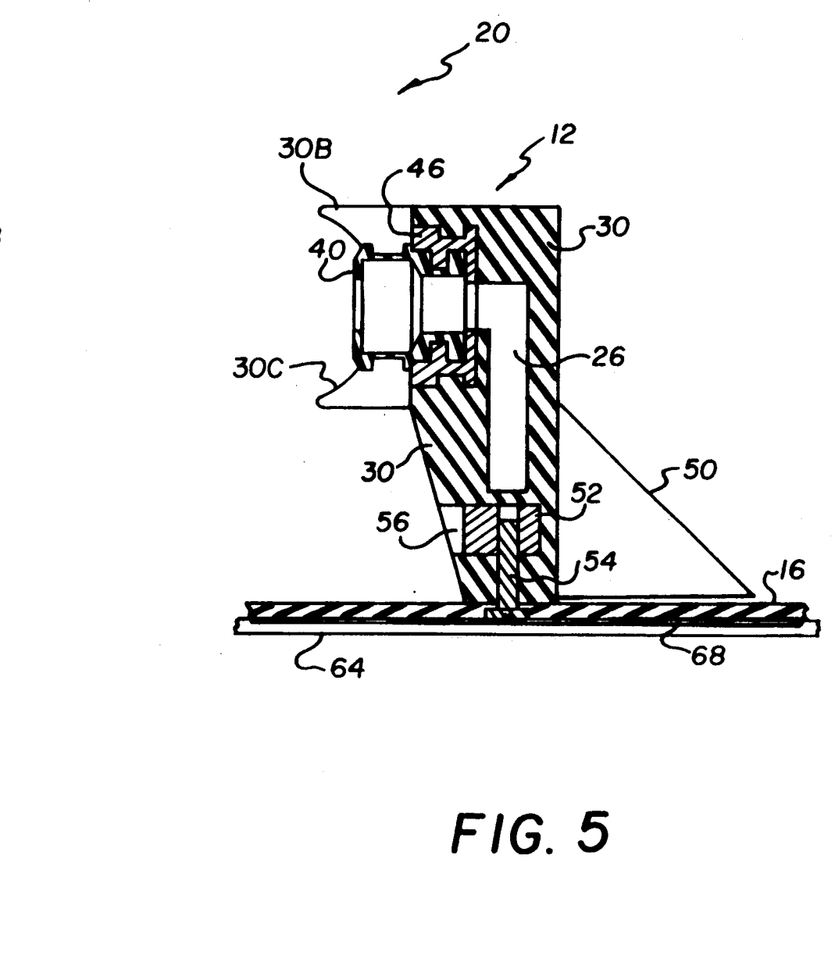
FIG. 5 is a side view, partially sectioned of a holder of the invention taken along the line 5—5 of FIG. 6.
Figure 6:
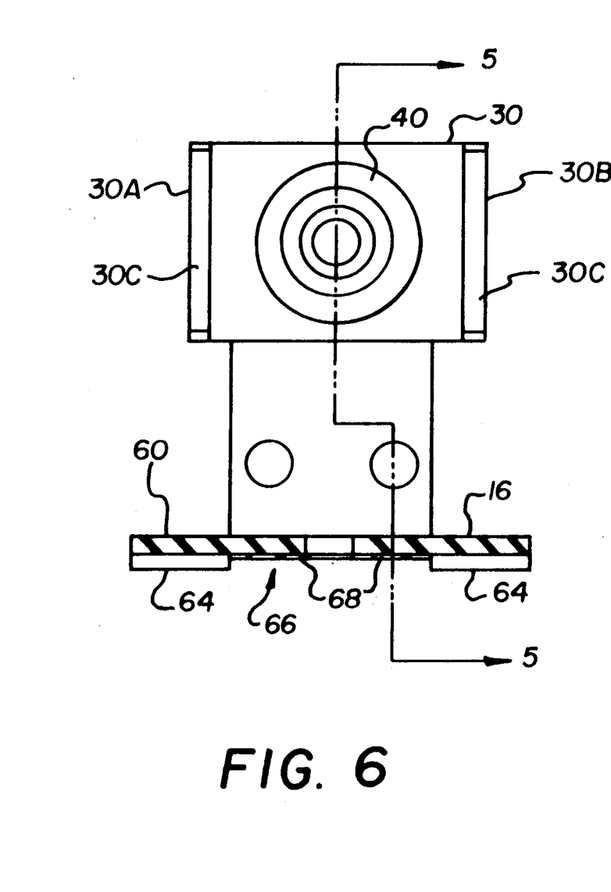
FIG. 6 is front view of the holder showing the means of fastening to the belt.
Figure 7:
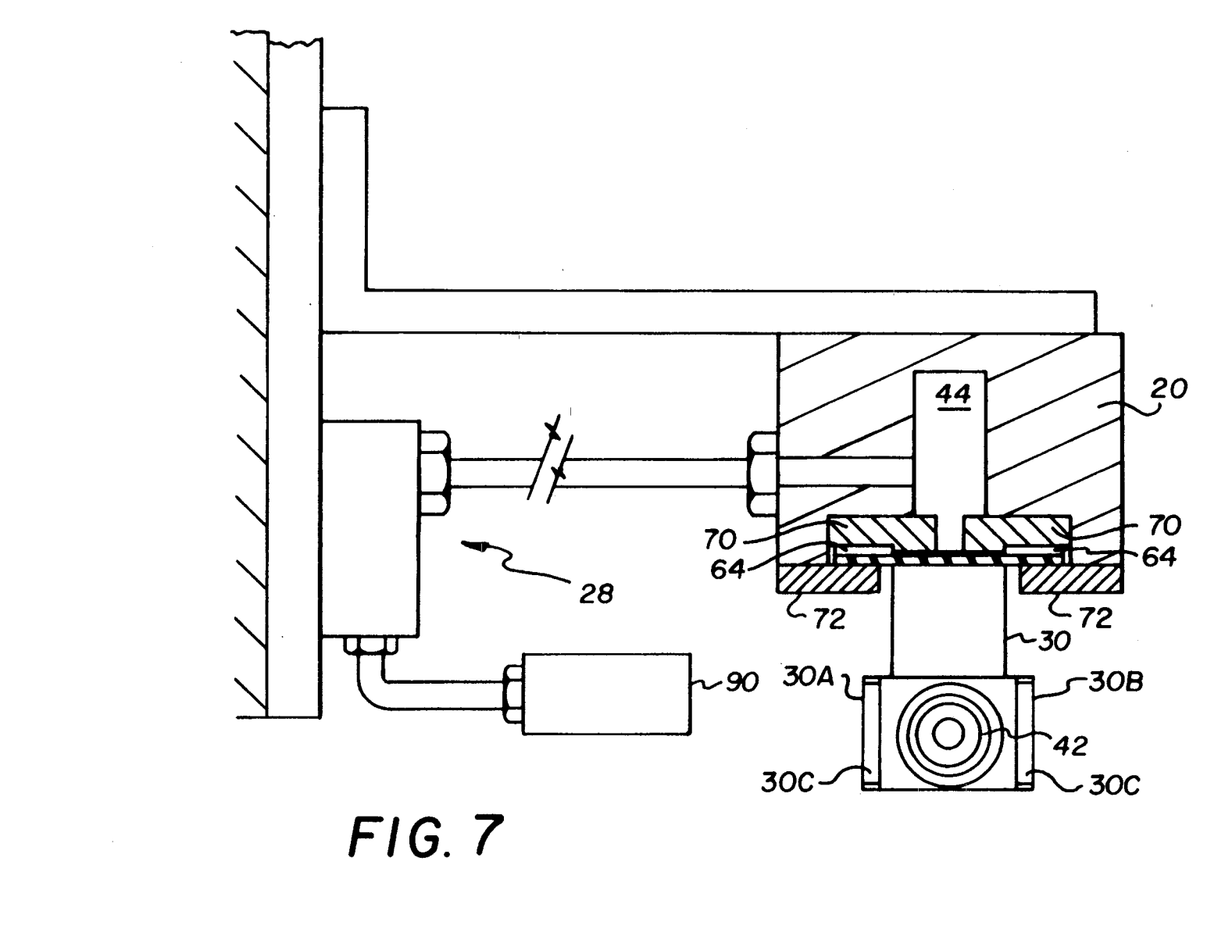
FIG. 7 is a front view, in partial section along the 7—7 line of FIG. 2.

In FIGS. 3, 5 and 7, object holder 12 20 (as best shown in FIG. 5) includes a vacuum chamber 26, belt to first moving conveyance 16 or belt for allowing vacuum pressure to selectively pass through the object holder 12. As described below, when the object holder 12 is located at a predetermined station $S_1$, $S_2$ or $S_3$ (FIG. 2), a the valve means 28, preferably a pneumatic valve, can be selectively actuated to release vacuum in the chamber 26 of object holder 12. Consequently, an object 1 positioned at that station $S_1$, $S_2$ or $S_3$, will be released from the object holder 12, and into the station. If the valve means 28 is not actuated, on the other hand, at a predetermined station $S_1$, $S_2$ or $S_3$, the object 1 will remain secured to the object holder 12 by the supplied vacuum pressure and will bypass the station. Furthermore, a programmable logic controller (described below) cooperating with the first and second moving conveyances 16,22 is used to identify the position of each object 1 along the moving conveyances 16,22 for release by the object holder 12 downstream of the second moving conveyance 22 at one of the other predetermined stations. As described below, release of an object 1 from the object holder 12 is associated with sub-system downtime and its apparent affect on the quality of the transported photosensitive film roll.

In FIGS. 4 and 5, object holder 12 comprises a body portion 30 configured to conform with a circumferential portion of the object 1. In the preferred embodiment, the specially conformed body portion 30 includes end walls 30A, 30B with semi-cylindrical cradles 30C positioned on opposite sides of suction cup member. A concave-like receiving portion 42 is provided on member 40 for engaging and, upon application of vacuum pressure, holding a generally cylindrical, circumferentially extended surface circumferential portion of a photographic film roll. A vacuum plenum 44 is included within means 20 for supplying a vacuum force sufficient to secure the object against the holder 12. Cup member 40 is secured to the object holder 12 by retainer member 46 pressed fitted into a cavity in object holder 12. Retainer member 46 is preferably made of a metallic material, such as steel, to ensure a substantially rigid bonding to object holder 12 and firm capturing of cup member 40 therein. In an alternative embodiment, object holder 12 has at least one flexible support member 50 that supports object holder 12 against particularly bending forces ($F_n$) which may arise during operations. Flexible support member 50 enables object holder 12 to flex in response to the force ($F_n$) while not separating from the first moving conveyance 16 (FIG. 2). Object holder 12 is preferably made of molded polyurethane, although other flexible materials could be used, such as rubber. According to FIG. 5, object holder 12 is flexibly bonded to first moving conveyance 16 for movement along continuous path 14. Preferably, a combination adhesive bond and a lug 52/screw 54 fastener are used to flexibly join the object holder 12 to the first moving conveyance 16. For convenience of the operator, a lug insertion opening 56 is provided in the body portion 30 of the object holder 12, as illustrated clearly in FIG. 5. Any adhesive sufficient to bond the polyurethane object holder 12 to the polyurethane belt 16 can be used. In a preferred embodiment of the apparatus 10, twenty (20) spaced identical object holders 12 are mounted for movement on first moving conveyance 16. A preferred synchronized speed of the first and second moving conveyance is up to about 200 parts per minute.

Referring to FIGS. 2 and 3, the object holder 12 is adapted for grasping objects from the second moving conveyance 22 when the object holder 12 is oriented at an angle Θ of less than about 45° with the first centerline 18 of the first moving conveyance 16. Preferably, Θ is about 16°. According to FIG. 2, the object holder 12 releases the object 1 at a predetermined station $S_1$, $S_2$, or $S_3$ when the object holder 12 is oriented normal to the first centerline 18. Those skilled in the art will appreciate that the grasping and releasing angle of the object holder 12 can be broadened or narrowed without departing from the scope of this invention.

In the preferred embodiment, first moving conveyance 16 is a closed loop timing belt having a substantially flat first outer side 60 and a second inner side 62 having a plurality of spaced teeth 64. A continuous channel 66 is formed through a center portion of the spaced teeth 64 for receiving a liner material layer 68 that reduces friction between a pair of guide members 70 and the belt 16. See FIG. 7. Guide members 70 support the belt 16 from distortion when vacuum pressure being provided to the object holders 12. Sealing members 72 are also provided on means 20 for minimizing vacuum pressure leaks from the vacuum chambers A timing belt preferred by the inventors is one manufactured by Brecoflex Corporation, P.O. Box 829, Eatontown, N.J.

Figure 8:
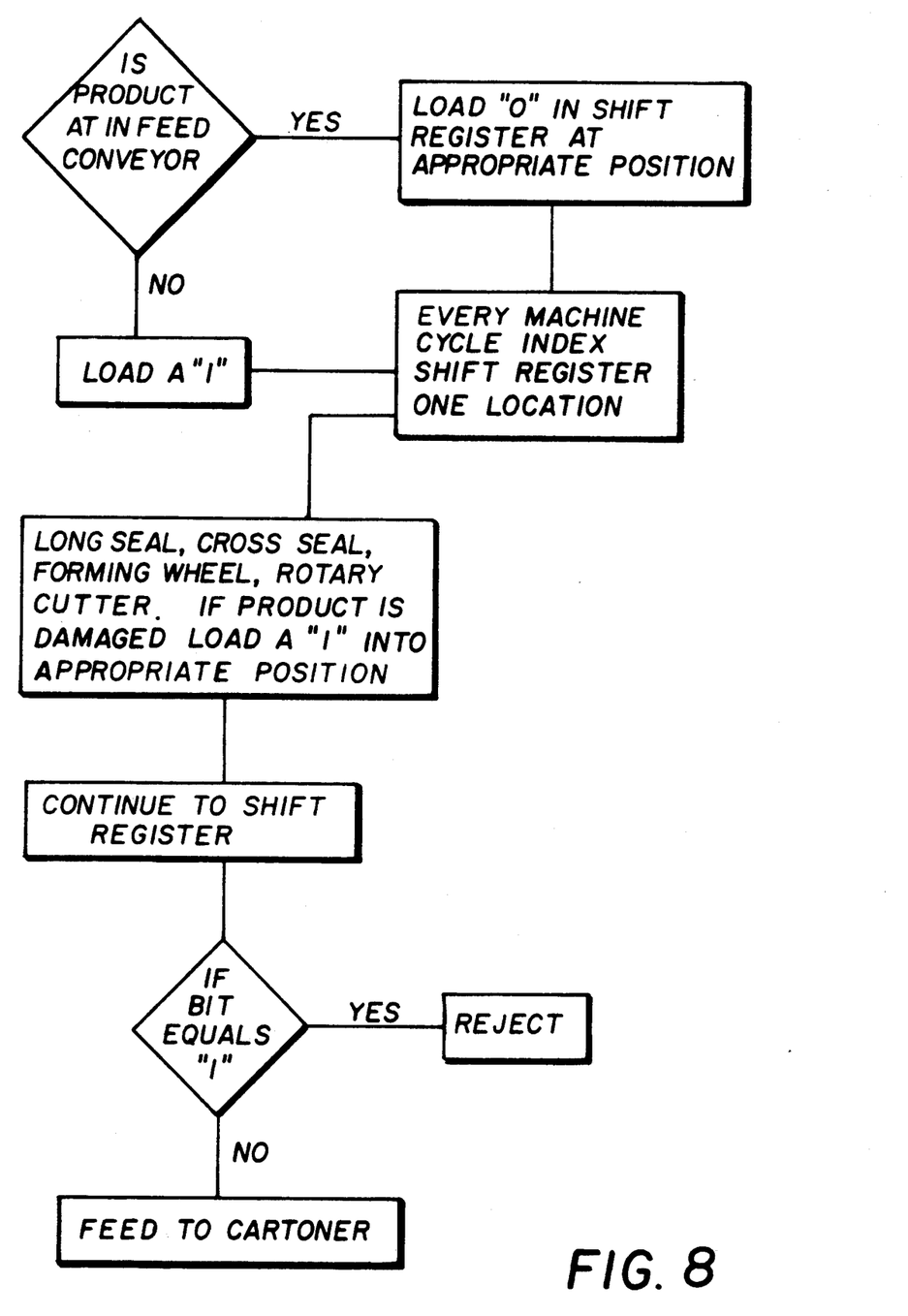
FIG. 8 is the logic control flow chart for identifying the position of objects along the upstream moving conveyance.

Referring again to FIG. 4, means 80, such as a shift register, is provided for identifying packaged film rolls moving along the second moving conveyance 18 for release at a predetermined station $S_1$, $S_2$, or $S_3$. Shift register 80 cooperates with the wrapping operation (not shown) and the second conveyance 22 described above. According to preprogrammed logic (FIG. 8) coded signals are associated with each spool position $P_n$, $P_{n+1}$, $P_{n+2}$, etc. along the second moving conveyance 22. If the product is exposed to deleterious conditions, for example excessive heating at sealing or excessive pressure at the cutting station, packaged film rolls on the second moving conveyance 22 in close proximity with the malfunction are identified and conveyed along the first moving conveyance 16 to the rework $S_1$ or reject stations $S_2$ where the rolls are released by the object holder 12 into the predetermined station. Otherwise, the package film rolls are conveyed along the first moving conveyance 16 and released at the cartoning station $S_3$. Release of objects from the object holder 12 at any one predetermined station is accomplished by inhibiting flow of vacuum to the object holder 12 when it is positioned at a specific station, as described above. A programmable logic controller (not shown) enables the aforementioned series of events to occur without operator intervention.

In operation, to use the apparatus 10 of the invention, the operator would first load the spools into a prefeeder hopper upstream of the apparatus 10. The spools are metered to the centrifugal feeder and delivered to the wrapper via a conveyor, as described above. During wrapping, a tubular structure of overwrap material is formed around the spools and then sealed at downstream stations. After the tubular structure is sealed, a single stream of wrapped spools is then transported to a cutting station where individual packaged film rolls are formed. The exact locations of packaged film rolls along the first and second moving conveyances 16, 22 are determined by initiating operation of the wrapper operation. Accordingly, if the sealing or cutting system, for instance, malfunctioned, packaged rolls could then be singled out for disposal in one of several predetermined stations. Disposal is accomplished in apparatus 10 by precisely picking up and delivering the individually packaged rolls to one of the predetermined stations. A vacuum source 90 cooperating with valve 28 and object holder 12 provides means for grasping and holding the photosensitive film roll during transport. Moreover, means for releasing an individual roll of film at a predetermined stations is provided by valve 28 which vents the vacuum port appropriate port of vacuum plenum 44 at the station. Plenum 44 may be divided into a plurality of vacuum ports for supplying vacuum force to each passing object holder 12 and thereby alternatively holding or releasing an object 1 at each vacuum port.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes for exemplification, but is to be limited only by the scope of the attached claim or claims, including the full range of equivalency to which each element thereof is entitled.

What is claimed is:

1. Apparatus for conveying and sorting objects between a predetermined number of stations along a fixed path, the apparatus comprising:
   at least one object holder mounted for translational movement, said holder being provided with means for grasping and releasably holding said object in a fixed orientation;
   means for moving said holder along a continuous path having a first centerline, said moving means comprising an endless belt on which said holder is supported, said belt having a substantially flat outer side and an inner side, said inner side having a plurality of spaced teeth with a continuous channel extended through said teeth;
   guide members for supporting said belt on either side of said channel;
   a liner layer provided in said channel for reducing friction between said guide members and said belt;
   a vacuum plenum having a plurality of ports for selectively supplying vacuum force through said belt to each of said object holders; and
   means for selectively releasing individual objects at one of a predetermined number of stations along said path.

2. The apparatus recited in claim 1, further comprising a second moving conveyance having a second centerline substantially parallel to said first centerline, said first moving conveyance being adapted for synchronization with said second moving conveyance.

3. The apparatus recited in claim 1 wherein said continuous path is generally oval shaped.

4. The apparatus recited in claim 1 wherein said holder comprises a body portion configured to conform with a circumferential portion of the object.

5. The apparatus recited in claim 2 wherein said holder is adapted for grasping said object from said second moving conveyance when said holder is oriented at angle $\Theta$ of less than about 45° with the first centerline of said first moving conveyance.

6. The apparatus recited in claim 5 wherein $\Theta$ is about 16 degrees.

7. The apparatus recited in claim 5 wherein said object holder is adapted for releasing said object when said object holder is oriented normal to said first longitudinal axis.

8. The apparatus recited in claim 1 wherein said holder is made from a flexible material.

9. The apparatus recited in claim 8 wherein said flexible material is polyurethane.

10. The apparatus recited in claim 1 wherein said holder is flexibly mounted to said belt.

11. The apparatus recited in claim 10 wherein said holder is cooperatively adhesively bonded and bolted to said belt.

12. The apparatus recited in claim 1 wherein said holder is provided with at least one support member for flexibly supporting said holder.

13. The apparatus recited in claim 1 wherein said first conveyance means is provided with a centralized vacuum plenum having a plurality of ports for supplying vacuum force to each said holders for alternatively holding and releasing said object therefrom.

14. The apparatus recited in claim 1, further comprising:
 a pair of spaced cradle members formed in said holder for engaging a cylindrical, circumferentially extended surface portion of said object;
 a concave, vacuum actuated, suction cup positioned between said cradle members for grasping and releasably holding said surface portion of said object;
 a source of vacuum; and
 a vacuum chamber within said body portion, said chamber being connected to said suction cup and, through said first moving conveyance, to said source of vacuum.

15. The apparatus recited in claim 14, further comprising a flexible support member extended from said holder toward said first moving conveyance, whereby said holder can flex in response to engaging said object.

* * * * *

UNITED STATES PATENT AND TRADEMARK OFFICE
CERTIFICATE OF CORRECTION

PATENT NO. : 5,450,939
DATED : September 19, 1995
INVENTOR(S) : Meyers, et al

It is certified that error appears in the above-indentified patent and that said Letters Patent is hereby corrected as shown below:

On the title page, item [75] Inventors: second inventor should read
--Richard O. Toles, Wolcott; Steven P.--

Signed and Sealed this

Twelfth Day of December, 1995

Attest:

BRUCE LEHMAN

Attesting Officer

Commissioner of Patents and Trademarks